No. 695,962.  
N. W. STORER.  
SYSTEM OF ELECTRICAL DISTRIBUTION.  
(Application filed Aug. 30, 1900.)  
Patented Mar. 25, 1902.

(No Model.)

WITNESSES:  
C. L. Belcher  
Birney Hines

INVENTOR  
Norman W. Storer  
BY  
Kelley G. Carr  
ATTORNEY.

UNITED STATES PATENT OFFICE.

NORMAN W. STORER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

SPECIFICATION forming part of Letters Patent No. 695,962, dated March 25, 1902.

Application filed August 30, 1900. Serial No. 28,522. (No model.)

*To all whom it may concern:*

Be it known that I, NORMAN W. STORER, a citizen of the United States, residing at Edgewood Park, in the county of Allegheny and State of Pennsylvania, have invented a new and useful Improvement in Systems of Electrical Distribution, of which the following is a specification.

My invention relates to systems of electrical distribution in which variations of the normal electromotive force on account of changes of load on the work-circuit or other variations in circuit conditions are usually effected by providing two or more field-magnet windings for a generator or generators supplying energy to such circuit and utilizing such windings either separately or conjointly, and in the latter case so utilizing them as to obtain either a differential or a cumulative effect.

The object of my invention is to provide such apparatus and circuit connections as will permit of the use of a single winding on the field-magnet of the voltage-regulating generator or generators, and thus reduce the expenditure of copper to a minimum and insure a maximum degree of efficiency in the operation of the machines employed.

My invention is illustrated in the accompanying drawings, in which—

Figure 1:
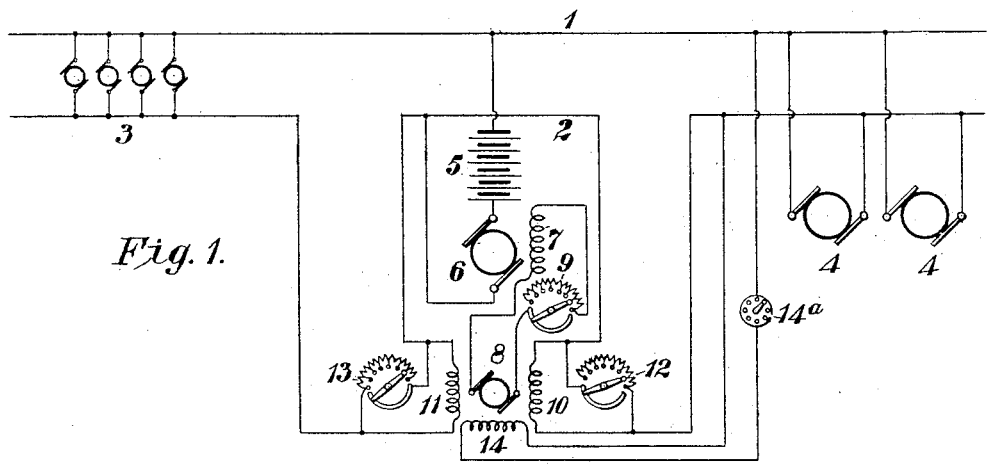
Figure 2:
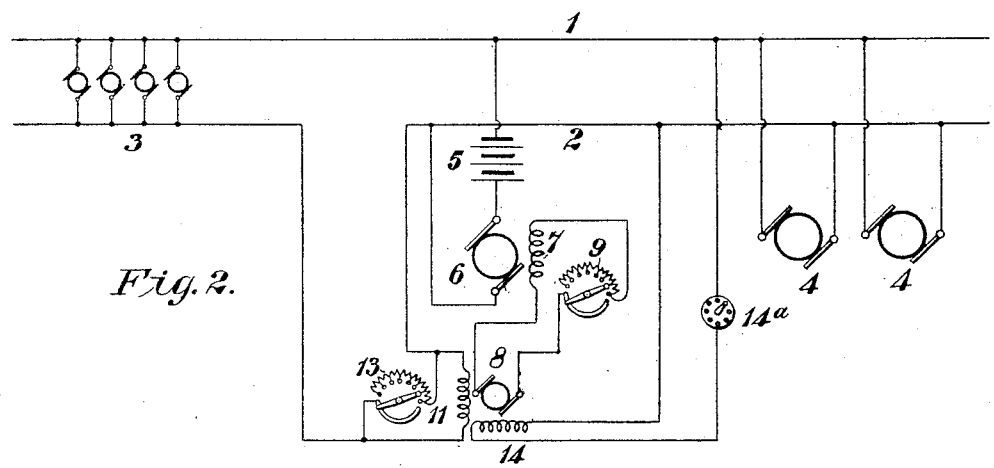
Figure 3:
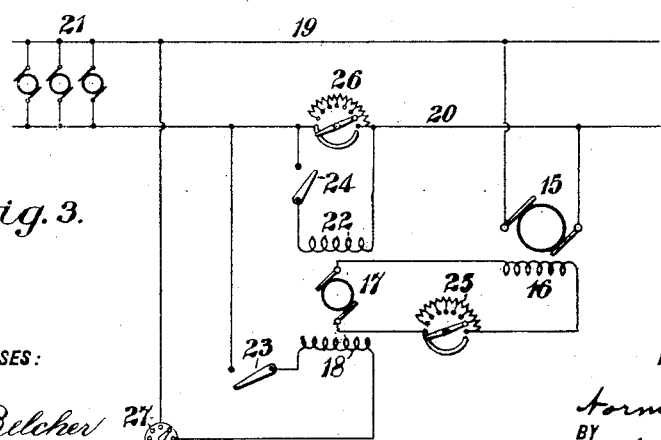

Figure 1 is a diagram of a system of distribution embodying one specific arrangement of apparatus, and Figs. 2 and 3 are diagrams of modifications.

As illustrated in Fig. 1, the distributing-conductors 1 and 2, to which translating devices 3 are connected in parallel, are supplied with energy from one or more dynamo-electric generators 4, two of such generators being shown in the drawings, though any other number may be employed without departing from my invention. These generators 4 may be mechanically-driven direct-current machines of any suitable type for supplying an approximately constant voltage or they may be rotary converters that receive alternating currents and transform them into direct currents for the translating devices, both of these varieties of machines being well known in the art. In systems of distribution of this general character in which the load varies within consideral limits from time to time, thus requiring widely different amounts of current, it is frequently found advisable if not actually necessary to supplement the current supplied to the line by the main generators by means of some auxiliary source of current in such manner and to such a degree that the voltage of the line may be maintained substantially constant without materially varying the load upon the main generators. In order to effect these results efficiently and at a minimum expense, I provide one or more secondary batteries and an auxiliary dynamo-electric generator connected in series with each other and to the line in parallel with the main generators and so excite the field-magnet of the auxiliary generator as to provide the additional amount of current required for extra loads or to cause the battery to be charged by the excess capacity of the generators over what is required on the line.

In the drawings I have shown a secondary battery 5, one terminal of which is connected to the main conductor 1 and the other terminal to one of the brushes of the auxiliary generator 6, the other brush of said generator being connected to the other line conductor 2. The field-magnet winding 7 of the auxiliary generator 6 has its terminals connected to the brushes of a separate generator 8. An adjustable rheostat 9 is included in circuit with the winding 7 and the generator 8 in order to control the electromotive force of the generator 6. The generator 8 may be of small size and have its windings so proportioned as to afford the greatest possible economy of material. The field-magnet of the exciter 8 is in this instance provided with two comparatively low resistance windings 10 and 11, so disposed as to afford a cumulative magnetizing effect. The terminals of the winding 10 are so connected to the conductor 2 as to receive either the entire current supplied to the system by the generators 4 or such part of that current as may be desired or needed. In order that the amount of current supplied to the winding 10 may be adjusted in accordance with the requirements of any particular case, I have provided an adjustable rheostat 12, the movable member of which may be so adjusted that all the current from the generators 4 shall pass through the winding 10 or so that any desired part of such current may be utilized for this purpose. The terminals of the winding 11 are connected in the same manner to the main conductor 2, but at such points that both the current from the generators 4 and that supplied by the secondary battery 5 and the auxiliary generator 6 shall pass through the winding 11 or such portions of the current as may be needed in any particular case, the adjustment of the amount of current traversing the winding 11 being made by means of an adjustable rheostat 13.

The resistance of rheostats 12 and 13 or either of them may be made inductive, so as to balance the inductive effect of the series field of the exciter, if found necessary or desirable in practice.

The field-magnet of the exciter 8 is also provided with a high-resistance winding 14, the terminals of which are connected in series with an adjustable rheostat 14ª across the main circuit 1 2 between the main generators and the secondary battery and auxiliary generator 6 or any other approximately constant-potential circuit, the high-resistance winding being so disposed and connected as to act in opposition to the windings 10 and 11, and thus afford a differential arrangement which will insure an adjustment of voltage and current on the line in accordance with variations in load. With this arrangement of apparatus when the entire output of the generators 4 is equal to the amount of current required by the load the secondary battery will supply no current to the line. If, however, an increase of line-current is demanded by reason of an increase in the load, the auxiliary generator 6 will raise the voltage of the battery, so as to cause current to flow from the battery to the line, and, conversely, if the demand for line-current decreases by reason of a decrease of the load below the normal, the auxiliary generator will raise the voltage so as to charge the battery, the effect of the auxiliary generator and battery being, therefore, such as to keep a constant load on the main generators by taking care of all excessive loads and receiving the energy supplied by the main generators when the load is small to supply a charge for the battery. With this arrangement of apparatus it is possible to utilize a standard type of generator as the auxiliary generator or booster and employ as a special exciter a machine of small size, in which the materials may be more economically arranged and utilized than would be possible if the field-magnet windings of the auxiliary generator were so constructed and arranged as to afford the automatic regulation desired.

The modification illustrated in Fig. 2 differs from that illustrated in Fig. 1 only in the omission of the winding 10 from the field-magnet of the generator 8, and since corresponding parts are designated by the same reference-numerals in both figures the description heretofore given may be read in connection with what is shown in both figures.

In Fig. 3 I have shown apparatus adapted for use in lieu of a compound-wound generator provided with means for cutting either winding out of circuit when the conditions are such that both windings are not required. In cases where different amounts and kinds of load have made necessary the employment of generators which were convertible from compound to shunt or series wound machines the amount of material used has been largely in excess of that embodied in a non-convertible compound-wound machine.

In order to reduce the expense and at the same time provide more efficient apparatus, I employ a generator 15, having a single field-magnet winding 16, and energize the winding by means of a small generator 17, having one field-magnet winding 18, connected across the mains 19 and 20 between the generator 15 and the translating devices 21 and having another winding 22, having a series connection with the main conductor 20.

I provide a switch 23 for opening and closing the circuit of winding 18 and a similar switch 24 for opening and closing the circuit of winding 22. The rheostat 25 is employed in the same relations and for the same purpose as the rheostat 9 of Figs. 1 and 2, and the rheostats 26 and 27 are respectively employed in the same relations and for the same purposes as the rheostats 13 and 14ª of Figs. 1 and 2.

While I have shown and described my invention in connection with certain specific systems, I desire it to be understood that it is not limited to such specific arrangements and combinations of apparatus, since it is susceptible of use where any generator having a differential winding or one having two or more windings, used either simultaneously or independently, would ordinarily be used.

I claim as my invention—

1. In a system of electrical distribution, the combination with one or more dynamo-electric generators for supplying energy to translating devices in parallel, of a secondary battery and an auxiliary dynamo-electric generator connected in series with each other and in parallel with the main generator or generators and an exciter for said auxiliary generator provided with two field-magnet windings respectively having a series connection with the line between the main generator or generators and the secondary battery and between the battery and the translating devices; and with a high-resistance opposing field-magnet winding connected across the line between the main generator or generators and the battery.

2. In a system of electrical distribution, one or more main generators in combination with a regulating dynamo-electric generator for producing and maintaining an approximately constant load on the main generator or generators and having a single field-magnet winding, of an exciter for said winding having a series field-magnet winding connected in the main circuit between said regulating-generator and the translating devices and an opposing field-magnet winding connected across the main circuit between the main generator or generators and the regulating-generator.

3. In a system of electrical distribution, the combination with a main generator and a regulating-generator for maintaining an approximately constant load on the main generator, of an exciter for the field-magnet winding of said regulating-generator having differential windings respectively connected across the main circuit between the main generator and the regulating-generator and in series with the main generator and the translating devices.

4. In a system of electrical distribution, the combination with a main generator for supplying energy to a variable load requiring an approximately constant voltage, of a secondary battery and an auxiliary dynamo connected in series with each other across the main circuit and an exciter for said auxiliary dynamo having differential field-magnet windings respectively connected across the main circuit between the main generator and the auxiliary generator and in series between the main generator and the translating devices so as to control the output of the auxiliary generator and battery in accordance with the amount of load.

5. In a system of electrical distribution, the combination with a main generator supplying an approximately constant voltage to translating devices, of an auxiliary dynamo and a secondary battery connected to the line in series with each other and an exciter having differential field-magnet windings respectively connected across the main line between the main generator and the battery and auxiliary generator and in series between the main generator and the translating devices and serving to insure an adjusting-current from the battery and auxiliary dynamo that compensates for changes in the load of the system.

6. The combination with a main circuit and a dynamo-electric generator having its armature connected to said circuit and having a single field-magnet winding, of an exciter therefor having a plurality of field-magnet windings connected to the main circuit and means for adjusting the current supplied to said windings either relatively or independently, so as to insure the performance of the desired work by the generator.

In testimony whereof I have hereunto subscribed my name this 28th day of August, 1900.

NORMAN W. STORER.

Witnesses:
BIRNEY HINES,
JAMES B. YOUNG.